US007971231B2

(12) United States Patent
Gupta et al.

(10) Patent No.: US 7,971,231 B2
(45) Date of Patent: Jun. 28, 2011

(54) CONFIGURATION MANAGEMENT DATABASE (CMDB) WHICH ESTABLISHES POLICY ARTIFACTS AND AUTOMATIC TAGGING OF THE SAME

(75) Inventors: Pratik Gupta, Cary, NC (US); Neeraj Joshi, Morrisville, NC (US); David L. Kaminsky, Chapel Hill, NC (US); David B. Lindquist, Raleigh, NC (US); Balachandar Rajaraman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/866,243

(22) Filed: Oct. 2, 2007

(65) Prior Publication Data
US 2009/0089072 A1 Apr. 2, 2009

(51) Int. Cl.
*H04L 29/06* (2006.01)
*G06F 17/00* (2006.01)
(52) U.S. Cl. .............................. 726/1; 726/4
(58) Field of Classification Search ............ 726/1, 4
See application file for complete search history.

(56) References Cited

U.S. PATENT DOCUMENTS

| 6,243,747 | B1 * | 6/2001 | Lewis et al. ............. 709/220 |
|---|---|---|---|
| 6,418,468 | B1 * | 7/2002 | Ahlstrom et al. ........ 709/223 |
| 6,944,183 | B1 * | 9/2005 | Iyer et al. ............... 370/466 |
| 6,978,379 | B1 * | 12/2005 | Goh et al. .............. 726/10 |
| 7,133,907 | B2 * | 11/2006 | Carlson et al. .......... 709/220 |
| 7,140,035 | B1 * | 11/2006 | Karch ................... 726/1 |
| 7,159,125 | B2 * | 1/2007 | Beadles et al. ........... 713/193 |
| 7,203,730 | B1 * | 4/2007 | Meyer et al. ............ 709/213 |
| 7,219,140 | B2 * | 5/2007 | Marl et al. ............. 709/219 |
| 7,233,935 | B1 * | 6/2007 | Chandler ................ 706/47 |
| 7,257,835 | B2 * | 8/2007 | Jones ................... 726/1 |
| 7,376,719 | B1 * | 5/2008 | Shafer et al. ............ 709/220 |
| 7,385,938 | B1 * | 6/2008 | Beckett et al. .......... 370/254 |
| 7,415,728 | B2 * | 8/2008 | Morohashi et al. ....... 726/25 |
| 7,426,748 | B2 * | 9/2008 | Imai .................... 726/11 |
| 7,475,424 | B2 * | 1/2009 | Lingafelt et al. ......... 726/13 |
| 7,509,678 | B2 * | 3/2009 | Pearson et al. .......... 726/23 |
| 7,603,443 | B2 * | 10/2009 | Fong et al. ............. 709/220 |
| 7,680,907 | B2 * | 3/2010 | Zarenin et al. .......... 709/220 |
| 7,769,835 | B2 * | 8/2010 | Zarenin et al. .......... 709/220 |
| 2002/0019864 | A1 * | 2/2002 | Mayer .................. 709/223 |
| 2002/0064136 | A1 * | 5/2002 | O'Neil .................. 370/267 |
| 2002/0104015 | A1 * | 8/2002 | Barzilai et al. .......... 713/201 |
| 2003/0028624 | A1 * | 2/2003 | Hasan et al. ............ 709/220 |
| 2003/0110262 | A1 * | 6/2003 | Hasan et al. ............ 709/226 |
| 2003/0126236 | A1 * | 7/2003 | Marl et al. ............. 709/220 |
| 2003/0154404 | A1 * | 8/2003 | Beadles et al. .......... 713/201 |

(Continued)

*Primary Examiner* — David Garcia Cervetti
(74) *Attorney, Agent, or Firm* — Patents On Demand, P.A.; Brian K. Buchheit; Scott M. Garrett

(57) ABSTRACT

The present invention discloses a solution for managing policy artifacts using a configuration management database (CMDB). Policies can be associated with a number of information technology resources, such as servers, businesses applications and the like. The solution permits automatic tagging of the policies (auto-discovery) as they enter the CMDB. For example, when a policy is added, it can be compared against a set of tagging rules. Multiple rules can match a new policy, which results in multiple tags being added for the policy. The policy specific tags can be optionally indexed for faster searching. Once indexed, the CMDB can support policy and policy tag based queries. In one embodiment, policy artifacts can be manipulated within a CMDB tool in a manner consistent with how the CMDB tool handles configuration items (CIs).

18 Claims, 2 Drawing Sheets

U.S. PATENT DOCUMENTS

| | | | | |
|---|---|---|---|---|
| 2004/0243699 | A1* | 12/2004 | Koclanes et al. | 709/224 |
| 2005/0027837 | A1* | 2/2005 | Roese et al. | 709/223 |
| 2005/0076243 | A1* | 4/2005 | Morohashi et al. | 713/201 |
| 2005/0086252 | A1* | 4/2005 | Jones et al. | 707/102 |
| 2006/0036730 | A1* | 2/2006 | Graham et al. | 709/224 |
| 2006/0048142 | A1* | 3/2006 | Roese et al. | 717/176 |
| 2006/0072456 | A1* | 4/2006 | Chari et al. | 370/230 |
| 2006/0075093 | A1* | 4/2006 | Frattura et al. | 709/224 |
| 2006/0168254 | A1* | 7/2006 | Norton et al. | 709/229 |
| 2006/0184490 | A1* | 8/2006 | Heim et al. | 706/46 |
| 2006/0242137 | A1* | 10/2006 | Shah et al. | 707/4 |
| 2006/0277590 | A1* | 12/2006 | Limont et al. | 726/1 |
| 2007/0106768 | A1* | 5/2007 | Frietsch et al. | 709/223 |
| 2007/0157288 | A1* | 7/2007 | Lim | 726/1 |
| 2007/0174708 | A1* | 7/2007 | Miyazaki et al. | 714/37 |
| 2007/0220061 | A1* | 9/2007 | Tirosh et al. | 707/200 |
| 2007/0255842 | A1* | 11/2007 | Bolder et al. | 709/230 |
| 2007/0268516 | A1* | 11/2007 | Bugwadia et al. | 358/1.15 |
| 2007/0282651 | A1* | 12/2007 | Naik et al. | 705/8 |
| 2008/0034424 | A1* | 2/2008 | Overcash et al. | 726/22 |
| 2008/0034425 | A1* | 2/2008 | Overcash et al. | 726/22 |
| 2008/0059633 | A1* | 3/2008 | Hu | 709/225 |
| 2008/0082486 | A1* | 4/2008 | Lermant et al. | 707/3 |
| 2008/0134286 | A1* | 6/2008 | Amdur et al. | 726/1 |
| 2008/0228908 | A1* | 9/2008 | Link et al. | 709/223 |
| 2008/0256593 | A1* | 10/2008 | Vinberg et al. | 726/1 |
| 2008/0281607 | A1* | 11/2008 | Sajja et al. | 705/1 |
| 2008/0281660 | A1* | 11/2008 | Sajja et al. | 705/8 |
| 2008/0294586 | A1* | 11/2008 | Lim | 706/47 |
| 2008/0301760 | A1* | 12/2008 | Lim | 726/1 |
| 2009/0012987 | A1* | 1/2009 | Kaminsky et al. | 707/102 |
| 2009/0100518 | A1* | 4/2009 | Overcash | 726/22 |

* cited by examiner

CONFIGURATION MANAGEMENT DATABASE (CMDB) WHICH ESTABLISHES POLICY ARTIFACTS AND AUTOMATIC TAGGING OF THE SAME

BACKGROUND

1. Field of the Invention

The present invention relates to the field of configuration management database (CMDB) and more particularly, to establishing policy artifacts and automatic tagging of the same.

2. Description of the Related Art

In order to ensure the security and availability of network resources, businesses employ a variety of usage policies. Usage policies exist at various granularities to control the functioning of network resources. The usage policy "only software developers can log onto development servers" is an example of a high-level usage policy, whereas "available memory space on development servers must be a minimum of 64 MB" is a low-level usage policy. Such policies are often defined, enforced, and stored by independent systems across a business network.

The lack of a central repository impedes access to information regarding policies and their relationships to network resources. For example, determining all the policies that affect a single server is a labor-intensive task that must by performed manually. Further, policies are often either anonymous or inflexibly categorized in regards to their applicability. That is, generating a list of policies that pertain to network availability requires examining all policies because the policies either do not have categories or the categorization schema does not allow for a policy to belong to more than one category. For example, the policy "CPU utilization of production servers should not exceed 60%" can be considered both a performance and an availability policy.

Configuration management databases (CMDBs) are often used by large companies to track physical and virtual network resources, such as computers, printers, and network connections. The CMDB records configuration items (CIs) and details about the important attributes and relationships between CIs. A key success factor in implementing a CMDB is the ability to automatically discover information about the CIs (auto-discovery) and track changes as they happen. Conventional implementations of CMDBs do not include policies among the resource items for tracking.

SUMMARY OF THE INVENTION

The present invention discloses a configuration management database (CMDB) that handles policies associated with information technology resources. Policies can be associated with a number of resources, such as servers, businesses applications and the like. The solution permits automatic tagging of the policies (auto-discovery) as they enter the CMDB. For example, when a policy is added, it can be compared against a set of tagging rules. Multiple rules can match a new policy, which results in multiple tags being added for the policy. The policy specific tags can be optionally indexed for faster searching. Once indexed, the CMDB can support policy and policy tag based queries. Policy artifacts can be manipulated within a CMDB tool in a manner consistent with manipulating configuration items (CIs) of the CMDB.

The present invention can be implemented in accordance with numerous aspects consistent with the material presented herein. For example, one aspect of the present invention can include a CMDB system that includes one or more CIs. Each CI can be a data structures that represents an information technology resource (e.g., a server, router, database, work unit, etc.) that is placed under configuration management. The CMDB system can include policy artifacts associated with a policy related to an information technology resource. Multiple policy tags can be related to the policy artifacts. The policy tags can include searchable keywords linked to the related policy artifact.

Another aspect of the present invention can include a method for automatically categorizing a usage policy in a CMDB. The method can include a step of acquiring a policy artifact. The policy artifact can define a policy related parameter for one or more resource items contained within a CMDB. The acquired policy artifact can be compared to at least one tagging rule. The rule can specify a set of programmatic instructions for categorizing policy artifacts. When the result of the comparing step indicates that the tagging rule is applicable, policy tags can be created using the applicable tagging rule. The created policy tags can be used when searching for the policy artifact.

Still another aspect of the present invention can include a software program stored in a machine readable medium that includes a data repository of information related to all components of an enterprise information system. The data repository can record configuration items and details about important attributes and relationships between configuration items. The data repository can also include one or more policy artifacts for policies associated with information technology resources.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
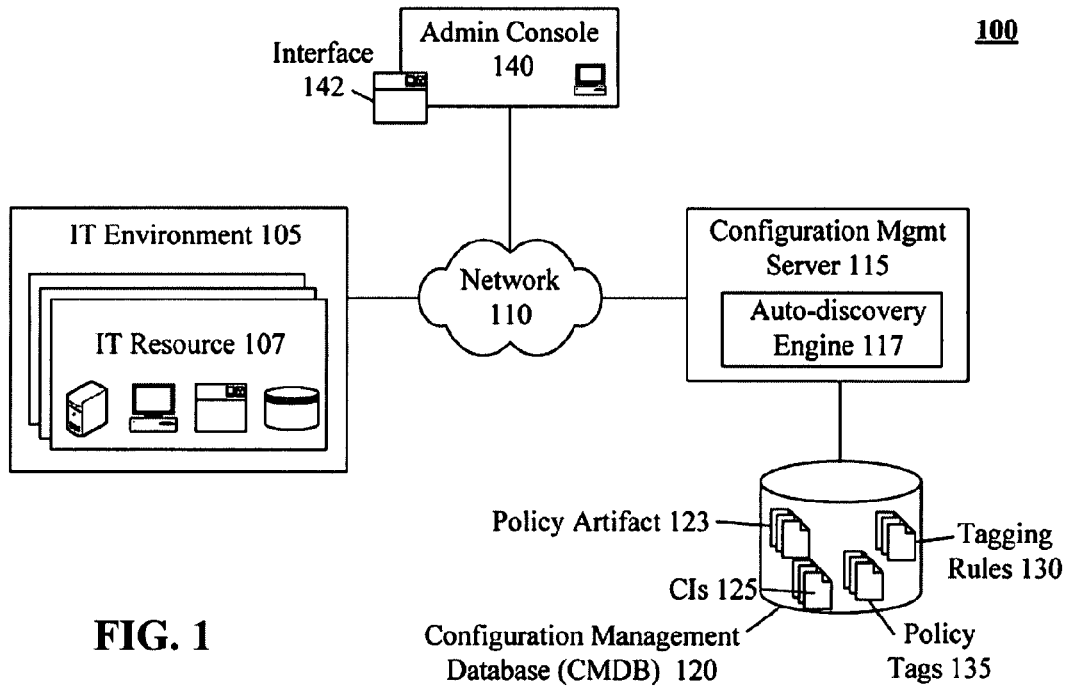
FIG. 1 is a schematic diagram illustrating a system for a configuration management database (CMDB) having configuration items (CIs) and policy artifacts in accordance with an embodiment of the inventive arrangements disclosed herein.

FIG. 1 is a schematic diagram illustrating a system 100 for a configuration management database (CMDB) having configuration items (CIs) 125 and policy artifacts 123 in accordance with an embodiment of the inventive arrangements disclosed herein. A policy associated with a policy artifact 123 can include usage policies, security policies, access policies, development policies, implementation policies, training policies, and the like. System 100 represents only those components that are particularly relevant to the present invention. That is, additional network components may exist in addition to those shown in FIG. 1 without detracting from the functionality of the present invention.

In system 100, information technology resources 105 of an Information Technology (IT) environment 105 can be connected to a configuration management server 115 via network 110. Information concerning each of the IT resources 107 or a set of resources 107 can be maintained by the configuration management server 115 and stored in a CMDB 120. An IT resource 107 can represent server, storage devices, communication devices, networks, middleware, software applications, firmware, data, and the like. An administration console 140 can permit authorized administrators to interact with the configuration management server 115 using interface 142. The CMDB 120 can include configuration items (CIs) 125, which are data structures representing IT resources that are placed under configuration management. The CMDB 120 can also include policy artifacts 123 that specify policies of one or more IT resources 107. The CMDB 120 can be a crossproduct solution that allows a user of interface 142 to view and manage details of the IT resources 107 of IT environment 105, which includes policies. Any type of policy can be managed, which includes security policies, file access policies, IT administration policies, software development policies, policies relating to handling different states of the IT environment (e.g., a high availability policy, a medium availability policy, etc), and the like.

The configuration management server 115 can include an auto-discovery engine 117, which analyzes IT resources 107 of the IT environment. The auto-discovery engine 117 can detect changes to resources and can automatically adjust CIs 125 and policy artifacts 123 to properly reflect the detected changes. System 100 can automatically create policy tags 135, which are keyword associations and/or searchable structures linked to a policy. A searchable set of policies applicable for a situation can be determined queried using the policy tags 135. When a policy artifact 123 is added/detected, the policy artifact 123 can be compared against a set of tagging rules 130. Multiple rules 130 can match a single policy artifact 123, which results in multiple policy tags 135 being added to the CMDB 120. In one embodiment, interface 142 can be used to manually modify/establish policy tags 135 and/or the tagging rules 130.

As used in system 100, a configuration management server 115 can be a server within which information is standardized, centrally managed, and shared among many different users. The server 115 can be used to discover and federate IT information spread across an enterprise (environment 105), which includes details about servers, storage devices, networks, middleware, applications, and data, which are all considered IT resources 107. The server 115 provides a set of automated, preconfigured, and customizable process workflows for change and configuration management processes. The server 115 can permit users via interface 142 to leverage the federated information to easily access key information about CIs 125 and policy artifacts 123 as well as their relationships, and to see all pending change and release schedules for CIs 125 and policy artifacts 123. As a result, the server 125 helps minimize business disruptions when implementing upgrades and other changes to the IT environment. The server 115 facilitates a systematic proposal, justification, evaluation, coordination, approval/disapproval of proposed changes, and the implementation of approved changes in the configuration of a CI 125 after a configuration baseline has been established for the CI 125. Conventional CMDB 120 and server 115 solutions include, but are not limited to, IBM TIVOLI Change and Configuration Management Database, CA CMDB Product Solution, HP Universal CMDB, ALTIRIS CMDB, CONFIGURESOFT federated CMDB, ORACLE Enterprise Manager Configuration Management Pack and CMDB, ZENOSS, NETDIRECTOR, PROCESS WORX CMDB, and the like.

The CI 125 is a data structure representing an aggregation of hardware and/or software that is designated for configuration management. CI's 125 can include requirements, code, documents, models, hardware, hardware components, and other units. Configuration management server 115 oversees a life of the CIs 125 through a combination of processes and tools to avoid an introduction of errors relating to improper testing or incompatibilities with other CIs 125. CIs 125 are usually described using configurable attributes, grouped as technical attributes, ownership attributes, and relationship attributes.

A policy artifact 123 can be a data structure that includes a description of a policy that applies to an IT resource, a group of IT resources, and/or an IT process or that describes a policy that is related to one or more IT artifacts in a programmatically definable manner. A policy attribute can be one of a set of attributes/objects associated with a single policy artifact 123.

As used herein, presented data stores, including CMDB store 120, can be a physical or virtual storage space configured to store digital information. Data store 120 can be physically implemented within any type of hardware including, but not limited to, a magnetic disk, an optical disk, a semiconductor memory, a digitally encoded plastic memory, a holographic memory, or any other recording medium. Data store 120 can be a stand-alone storage unit as well as a storage unit formed from a plurality of physical devices. Additionally, information can be stored within data store 120 in a variety of manners. For example, information can be stored within a database structure or can be stored within one or more files of a file storage system, where each file may or may not be indexed for information searching purposes. Further, data store 120 can utilize one or more encryption mechanisms to protect stored information from unauthorized access.

Network 110 can include any hardware/software/and firmware necessary to convey data encoded within carrier waves. Data can be contained within analog or digital signals and conveyed though data or voice channels. Network 110 can include local components and data pathways necessary for communications to be exchanged among computing device components and between integrated device components and peripheral devices. Network 110 can also include network equipment, such as routers, data lines, hubs, and intermediary servers which together form a data network, such as the Internet. Network 110 can also include circuit-based communication components and mobile communication components, such as telephony switches, modems, cellular communication towers, and the like. Network 110 can include line based and/or wireless communication pathways.

Figure 2:
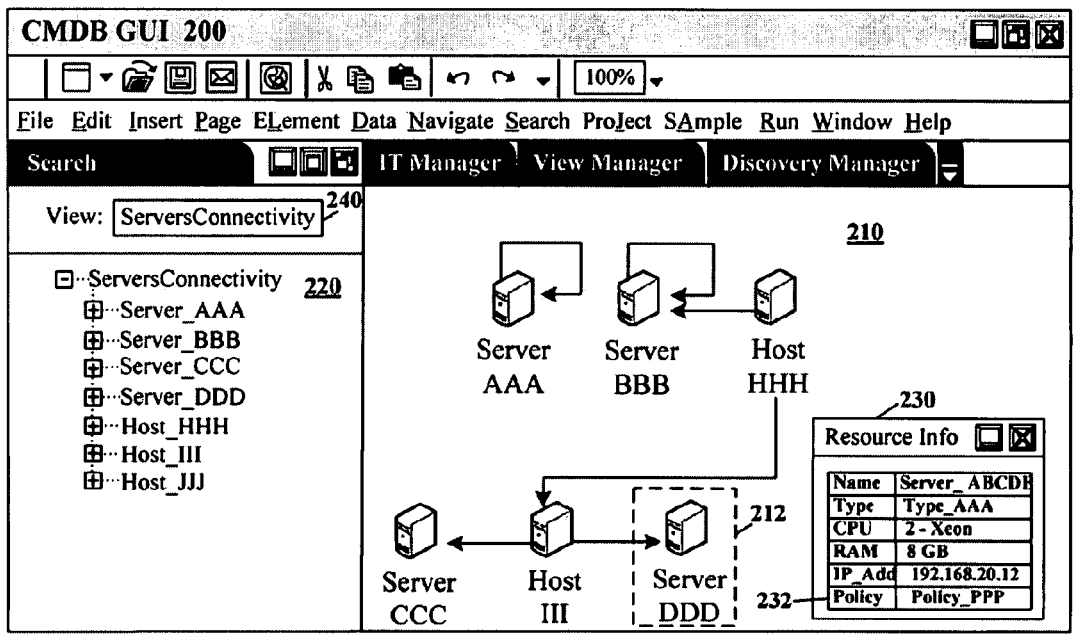
FIG. 2 shows a sample CMDB interface for a CMDB that includes policy artifacts in accordance with an embodiment of the inventive arrangements disclosed herein.

FIG. 2 shows a sample CMDB interface 200 for a CMDB that includes policy artifacts in accordance with an embodiment of the inventive arrangements disclosed herein. The interface 200 can be one example of interface 142 of system 100, which can be an interface to any CMDB solution, such as an IBM TIVOLI based solution.

As shown, the GUI 200 provides a graphical representation of at least a portion of a configuration managed IT environment 210. An equivalent non-graphical presentation 220 of IT resources can also be included in interface 200. One or more of the presented resources can be selected 212, which results in configuration managed information 230 can be presented. This information 230 can include policy information, which is managed by the CMDB. The interface 200 can also include a search 240 element, which permits a user to enter criteria, which results in CIs, policy artifacts, or other CMDB managed objects that match the criteria. Input to element 240 can be compared against a set of tags (e.g., tags 135) or keywords that are associated with the managed policy artifacts and/or CIs.

It should be appreciated that the graphical user interface (GUI), GUI elements, and graphical artifacts presented herein are for illustrative purposes only and are not meant to limit the invention in any regard.

Figure 3:
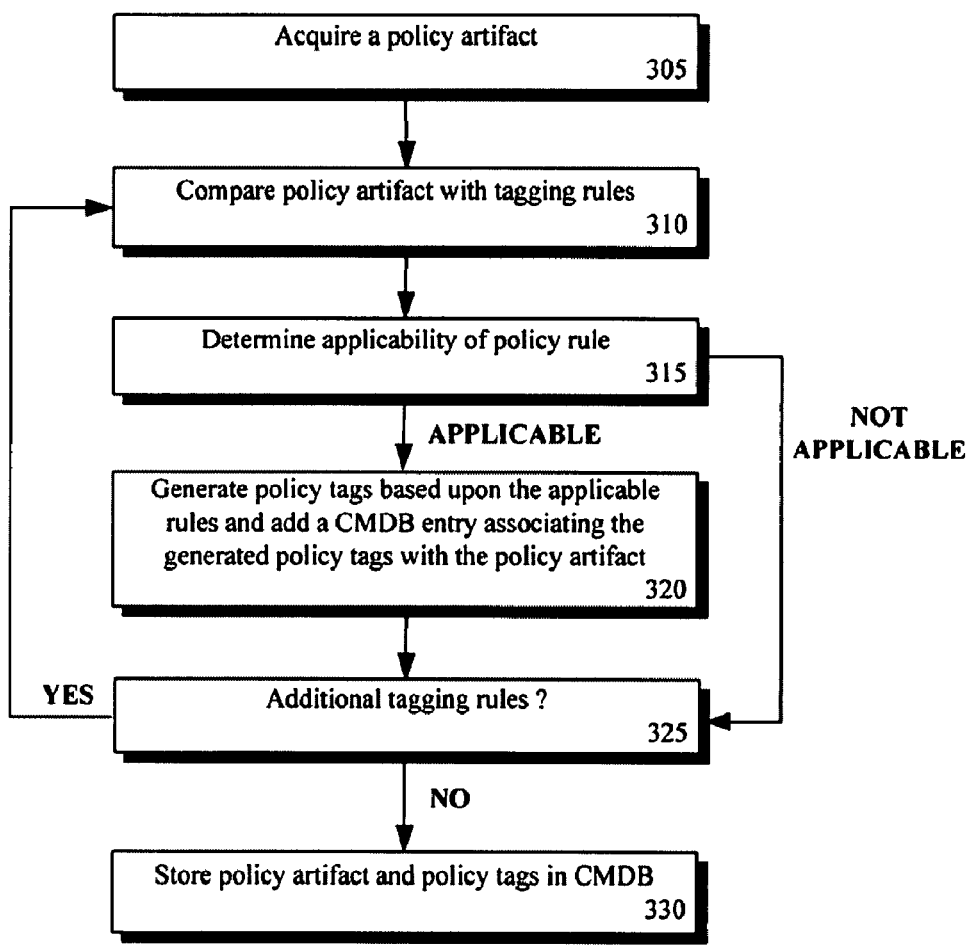
FIG. 3 is a flow chart of a method describing the automatic categorization of a policy artifact in accordance with an embodiment of the inventive arrangements disclosed herein.

FIG. 3 is a flow chart of a method 300 describing the automatic categorization of a policy artifact in accordance with an embodiment of the inventive arrangements disclosed herein. Method 300 can be performed in the context of system 100 or any other CMDB system that manages policy artifacts.

Method 300 can begin with step 305 where a policy artifact can be acquired. Acquisition of the policy artifact can be achieved through an automatic process, such as an auto-discovery function of the CMDB or by manual input.

Once the CMDB acquires the policy artifact, step 310 can execute in which the policy artifact can be compared to a policy template, which establishes a set of tagging rules. The applicability of the tagging rules can be determined in step 315. When a tagging rule is found to be applicable to the policy artifact, step 320 can execute where policy tags can be generated based upon the applicable rules. A CMDB entry can be added that associates the generated policy tags with the policy artifact. Either upon the completion of step 320 or the tagging rule is found to not apply to the policy artifact, the existence of additional tagging rules can be ascertained in step 325. The presence of additional policy rules can return flow to step 310. When additional policy rules do not exist, step 330 can execute in which the policy artifact and associated policy tags can be stored in the CMDB.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A configuration management database (CMDB) system comprising hardware and software comprising:
   a plurality of configuration items (CIs) stored in a physical storage medium able to be accessed and utilized by computing equipment, wherein each configuration item is a data structure representing an information technology resource that is placed under configuration management;
   a plurality of policy artifacts stored in a physical storage medium able to be accessed and utilized by computing equipment, wherein each policy artifact is associated with a policy related to an information technology resource; and
   a plurality of policy tags stored in a physical storage medium able to be accessed and utilized by computing equipment that are related to the policy artifacts, wherein said policy tags are indexed to a set of searchable keywords, which are able to be used when searching for related policy artifacts.

2. The configuration management database system of claim 1, further comprising:
   a plurality of tagging rules stored in a physical storage medium able to be accessed and utilized by computing equipment, which are used by the configuration management database system to automatically select specific ones of the policy tags and to associate the selected policy tags to at least one of the policy artifacts.

3. The configuration management database system of claim 2, wherein a plurality of tagging rules are applicable for at least one of the policy artifacts, which results in a plurality of policy tags, one for each of the tagging rules, being associated with the at least one policy artifact.

4. The configuration management database system of claim 1, further comprising:
   an auto-discovery engine for automatically detecting changes to the information technology resources under configuration management and for automatically adjusting the configuration items and the policy artifacts in accordance with the detected changes.

5. The configuration management database system of claim 4, wherein the configuration management database system is a cross-product solution that is configured to centrally manage all policies of an enterprise, said policies comprising usage policies, security policies, access policies, development policies, implementation policies, and training policies.

6. The configuration management database system of claim 4, further comprising:
   an administration interface comprising a software program stored in a physical storage medium able to be used by computing equipment for permitting a user to manually manipulate the configuration items, the policy artifacts, the policy tags, and the policy tags.

7. A method for automatically categorizing a usage policy in a configuration management database comprising:
   acquiring a policy artifact from computing equipment, wherein the policy artifact defines a usage parameter for one or more resource items contained within a configuration management database;
   comparing the acquired policy artifact to at least one tagging rule utilizing computing equipment, wherein the tagging rule specifies a set of programmatic instructions for categorizing policy artifacts;

when the result of the comparing step indicates that the tagging rule is applicable, associating via computing equipment the applicable policy tags with a related policy artifact using the applicable tagging rule, wherein the policy tags are able to be used when searching for the policy artifact; and during the associating of the policy tags with the related policy artifact, entering the policy tags via computing equipment into a designated attribute field of a database record of the configuration management database that corresponds to the policy artifact, wherein said hardware of said configuration management database system comprises a configuration management server which standardizes, centrally manages, and shares configuration management information, said configuration management database system comprising a user interface permitting a remotely located user accessing the server via a user interface to access managed information of configuration items, policy artifacts, relationships between configuration items and policy artifacts, and to view all pending change and release schedules for configuration items and policy artifacts.

8. The method of claim 7, further comprising:

storing via computing equipment the policy artifact within a policy database table within the configuration management database, wherein storage within the configuration management database allows standard database functions to be performed upon and with the policy table, wherein standard database functions include, at a minimum, adding new records, modifying existing records, deleting existing records, creating relationships between records, and querying existing records.

9. The method of claim 7, wherein the comparing and associating of policy artifacts occur automatically in response to the acquiring step.

10. The method of claim 7, wherein the comparing of policy artifacts is repeated for a plurality of policy templates, and wherein the associating step is likewise repeated upon the result of the comparing step.

11. The method of claim 7, wherein the acquiring step occurs as the result of an automated process initiated by the configuration management database.

12. The method of claim 7, wherein the acquiring step occurs as the result of a manual input of the policy artifact into the configuration management database.

13. The method of claim 7, comprising:

detecting changes via computing equipment to information technology resources under configuration management; and adjusting configuration items and the policy artifacts of the configuration management database using computing equipment responsive to and in accordance with the detected changes, where the adjusting of configuration items and the policy artifacts is not dependent upon manually entered user input.

14. A software program stored in a machine readable medium comprising:

a data repository of information related to all components of an enterprise information system, the data repository recording in a non-transitory storage medium configuration items and details about attributes of each of the configuration items and relationships between configuration items, wherein the data repository also stores at least one policy artifact indexed against configuration items for policies associated with information technology resources; and a plurality of tagging rules related to policy artifacts, wherein said tagging rules are used to associate policy tags with policy artifacts, wherein the policy tags are associated with a set of keywords that are able to be used when searching for the policy artifacts.

15. The software program of claim 14, further comprising:

an auto-discovery engine configured to automatically detecting changes to the information technology resources under configuration management and for automatically adjusting the configuration items and the policy artifacts in accordance with the detected changes.

16. The software program of claim 14, wherein a single policy artifact is able to be related to at least two tagging rules, which generate at least two policy tags for the policy artifact.

17. The software program of claim 14, wherein the information technology resources comprise servers, storage devices, networks, middleware, application, and data, wherein said software program running in a configuration management server comprising hardware, said software program enabling the configuration management server to standardize, centrally manage, and share configuration management information of said data repository, said software enabling a user interface permitting a remotely located user accessing the server via a user interface to access managed information of the data repository for configuration items, policy artifacts, relationships between configuration items and policy artifacts, and to view all pending change and release schedules for configuration items and policy artifacts.

18. The software program of claim 14, wherein the policy artifacts are acquired as a result of an automated process initiated by a configuration management program.

* * * * *